United States Patent [19]

Kodera et al.

[11] Patent Number: 5,422,750
[45] Date of Patent: Jun. 6, 1995

[54] METHOD OF RUBBING AN ALIGNMENT CONTROL FILM USING PLURAL ROLLERS

[75] Inventors: Yasuto Kodera, Fujisawa; Kenji Onuma, Isehara; Masaaki Suzuki, Yokohama, all of Japan

[73] Assignee: Canon Kabushiki Kaisha, Tokyo, Japan

[21] Appl. No.: 58,359

[22] Filed: May 10, 1993

[30] Foreign Application Priority Data

May 13, 1992 [JP]  Japan .................. 4-146870

[51] Int. Cl.⁶ .......................................... G02F 1/1337
[52] U.S. Cl. ................................ 359/76; 359/78;
                                              359/100; 264/340
[58] Field of Search ............... 359/76, 78, 100;
                                       264/22, 108, 293, 340

[56] References Cited

U.S. PATENT DOCUMENTS

| 5,075,790 | 12/1991 | Hayashi et al. | 359/76 |
| 5,172,255 | 12/1992 | Brosig et al. | 359/76 |
| 5,221,981 | 6/1993 | Kodera et al. | 359/76 |

FOREIGN PATENT DOCUMENTS 203321  8/1990  Japan .

OTHER PUBLICATIONS

Patent Abstracts of Japan, vol. 11, No. 223 (Jul. 21, 1987) (P-597).
Patent Abstracts of Japan, vol. 12, No. 288 (Aug. 8, 1988) (P-741).
Patent Abstracts of Japan, vol. 13, No. 253 (Jun. 13, 1989) P-883).
Patent Abstracts of Japan, vol. 13, No. 261 (Jun. 16, 1989) (P-885).
Patent Abstracts of Japan, vol. 13, No. 261 (Jun. 16, 1989) (P-885).
Patent Abstracts of Japan, vol. 15, No. 469 (Nov. 27, 1991) (P-1281).
Patent Abstracts of Japan, vol. 16, No. 301 (Jul. 3, 1992) (P-1379).

*Primary Examiner*—Catherine Timm
*Attorney, Agent, or Firm*—Fitzpatrick, Cella, Harper & Scinto

[57] ABSTRACT

A rubbing apparatus is provided with an even number of, e.g., two, rubbing rollers. The two rollers are provided with rubbing clothes wound thereabout and each planted with pile yarn so that the standing directions with inclination of the pile yarn of the two rubbing rollers are parallel to the rotating direction of the rollers and mutually opposite to each other. A plurality of substrates each having an alignment control film thereon are successively rubbed by the rubbing rollers while the rotating direction of the rollers is changed for each substrate. As a result, the substrates are provided with a uniform alignment power free from irregularity. At the same time, the inclination of the pile yarn during the rubbing treatment is prevented, whereby the rubbing cloth can be used for an extended period.

8 Claims, 2 Drawing Sheets

METHOD OF RUBBING AN ALIGNMENT CONTROL FILM USING PLURAL ROLLERS

FIELD OF THE INVENTION AND RELATED ART

The present invention relates to a rubbing method for rubbing-treatment of an alignment control film for aligning a ferroelectric liquid crystal in a ferroelectric liquid crystal device used for display, etc., and a rubbing method using the apparatus.

A ferroelectric liquid crystal device is constituted by disposing a ferroelectric liquid crystal between a pair of substrates each having thereon a transparent electrode and an alignment control film directly contacting the ferroelectric liquid crystal to control the alignment of the liquid crystal molecules.

FIG. 1 illustrates a sectional structure of an example of such a ferroelectric liquid crystal device.

Referring to FIG. 1, the ferroelectric liquid crystal device has a cell structure including glass substrates 101 and 101a disposed opposite to each other with a prescribed gap therebetween set by spacers 104, and an adhesive 106 sealing the periphery of the substrates 101 and 101a. On the substrate 101 is further formed an electrode groups (e.g., an electrode group for applying a scanning voltage of a matrix electrode group) comprising a plurality of transparent electrodes 102 in a prescribed pattern of, e.g., stripes. On the substrate 101a is formed another electrode group (e.g., an electrode group for applying signal voltages of the matrix electrode structure) comprising a plurality of transparent electrodes 102a intersecting the above-mentioned, transparent electrodes 102. A liquid crystal 103 is disposed between the substrates 101 and 101a. Such a cell structure is disposed between a pair of polarizers 107 and 108 to form a liquid crystal display apparatus.

The electrodes 102 and electrodes 102a are respectively covered with insulating films 109 and 109a, respectively, for preventing short circuit, on which are further disposed alignment control films 105 and 105a. The alignment control films 105 and 105a may be formed as inorganic insulating films or organic insulating films subjected to a surface-aligning treatment.

Hitherto, the rubbing method has been practiced as a method of aligning treatment for providing such an alignment control films. In the rubbing method, a substrate is rubbed in one direction with a cloth planted with pile yarn so as to align liquid crystal molecules contacting the substrate in the rubbed direction. It is necessary that the rubbing is applied uniformly to the entire area of the substrate. In view of the productivity, the rubbing is generally performed as shown in FIG. 5. Referring to FIG. 5, a rubbing cloth 302 is wound about a cylindrical rubbing roller 301 and pile yarn planted onto the rubbing cloth 302 caused to contact a substrate 101 (or 101a). The rubbing roller 301 is rotated in a direction A or B while the substrate 101 (101a) or the rubbing roller 301 is moved in parallel relative to each other in a direction C or D, whereby the entire surface of the substrate 101 (101a) is subjected to an aligning treatment. Such a treatment has been conventionally applied.

In order to effect an identical aligning treatment for mass production, the rotation direction (A or B) of the rubbing roller 301 and the direction of movement (C or D) of the substrate 101 or the rubbing roller 301 are fixed to apply a rubbing treatment to a large number of substrates.

However, such a conventional rubbing method of using a fixed rotation direction of a rubbing roller is found to cause severe wearing of pile yarn planted to the rubbing cloth because the substrates are rubbed by only one side of the pile yarn. Further, the pile yarn is gradually inclined in one direction so that the uniaxial alignment control power imparted to the substrate is gradually weakened as the number of the aligning treatment applied to the substrates is increased, thus failing to provide a uniform alignment state of a liquid crystal. Accordingly, the rubbing cloth has to be renewed in a short period.

For this reason, there has been proposed a rubbing method wherein a substrate is rubbed by one side of pile yarn, a subsequent substrate is rubbed by an opposite side of the pile yarn, and subsequent substrates are alternately rubbed with one or the other side of the pile yarn. According to the method, the pile yarn is prevented from being inclined continually in one direction, so that a larger number of substrates can be rubbing-treated without weakening the alignment control power.

In the above-described rubbing method, however, there is still left a problem of a fluctuation or irregularity of the resultant alignment control power. According to our study, it has been found that the above-problem is attributable to the initial inclination of pile yarn of a rubbing cloth before use in rubbing treatment. More specifically, in the above-described rubbing method, it is preferred that pile yarn of a rubbing cloth before the rubbing treatment is planted upright (perpendicularly) onto the substrate cloth. However, the inclination of pile yarn on a rubbing cloth is difficult to prevent in view of the production process of such a rubbing cloth having pile yarn planted thereto. For example, such a rubbing cloth having pile yarn is produced in a long size and held in a rolled state before it is cut and wound about a rubbing roller. During the storage in a rolled state, pile yarn of the rubbing cloth is likely or inevitably inclined in the rolled direction. In case where such a rubbing cloth having pile yarn in an initially inclined planted state is used for rubbing, it has been found that different alignment control powers result depending on whether a substrate is rubbed with one side of the pile yarn or the other side of the pile yarn. This is presumably because the initial inclination of pile yarn results indifferent frictional forces between the pile yarn and the substrate (alignment control film) depending on different rotation directions of the rubbing roller. As a result, there has been caused a problem that a pair of substrates treated in this manner are provided with different uniaxial alignment control powers, thus failing to provide a uniform alignment characteristic or bistability over the entire are of the resultant liquid crystal panel.

SUMMARY OF THE INVENTION

In view of the above-mentioned problems of the prior art, an object of the present invention is to provide a rubbing apparatus and a rubbing method capable of processing a larger number of substrates without weakening the uniaxial alignment control power and providing more uniformized uniaxial alignment control powers to a pair of substrates.

According to a first aspect of the present invention, there is provided a rubbing apparatus for imparting an alignment control power to an alignment control film of a ferroelectric liquid crystal device, comprising an even number of at least two cylindrical rubbing rollers rotating in an identical direction, wherein each rubbing roller comprises a rubbing cloth wound therebout and planted with pile yarn standing against the cloth with an inclination in a direction parallel to the rotation direction of the rubbing rollers, and a half of the even number of rubbing rollers has an inclination direction of the pile yarn opposite to that of the remaining half of the even number of rubbing rollers.

According to a second aspect of the present invention, there is provided a rubbing method wherein the above-mentioned rubbing apparatus is used in such a manner that a plurality of substrates are successively treated by rubbing while the rubbing rollers are caused to change their rotation direction for every prescribed number of substrates, particularly for each substrate.

These and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Figure 2:
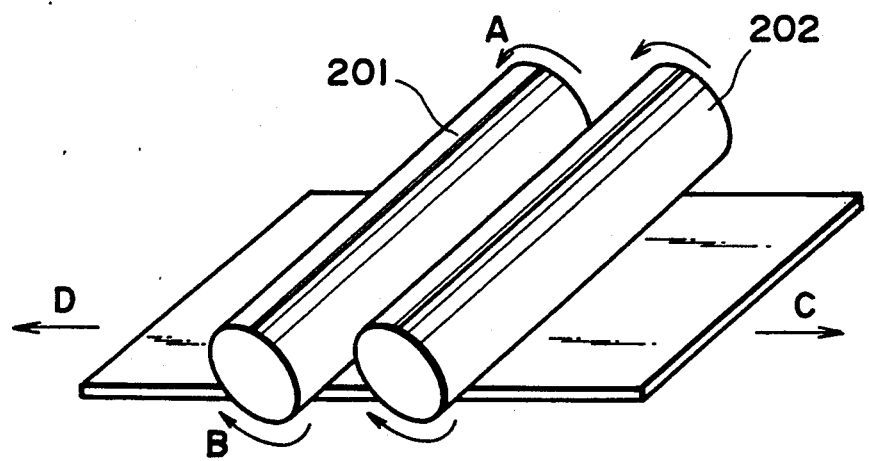
FIG. 2 is a perspective view for illustrating the rubbing apparatus and rubbing method according to the invention.
Figure 3:
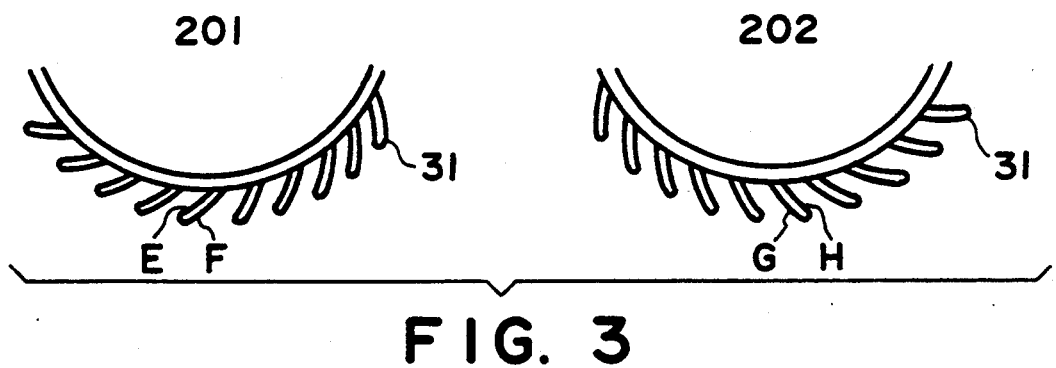
FIG. 3 is a partial side view of a pair of rubbing rollers showing the inclination of pile yarn in the rubbing apparatus according to the invention.

FIG. 2 illustrates a vital part of a rubbing apparatus according to the present invention including two rollers. Referring to FIG. 2, a first roller 201 and a second roller 202 are disposed so as to be rotatable in the direction of A or B simultaneously. When the rollers 201 and 202 rotate in the direction A, a substrate 101 is moved in a direction C. On the other hand, when the rollers 201 and 202 rotate in the direction B, the substrate 101 is moved in a direction D. FIG. 3 is a partial side view of these rollers, wherein rubbing clothes are applied to the first roller 201 and the second roller 202 so that the standing directions (inclinations) of the planted pile yarn 31 are reverse to each other.

In a preferred embodiment of the present invention, rubbing is performed in such a manner that a first substrate is rubbed while being moved in the direction C, a second substrate is rubbed while being moved in the direction D, a third substrate is rubbed while being moved in the direction C, and subsequent substrates are rubbed while being moved in alternate directions and while the rotating directions of the rollers 201 and 202 are alternately changed.

Hereinbelow, the present invention will be described based on specific examples.

EXAMPLES 1-5

Figure 1:
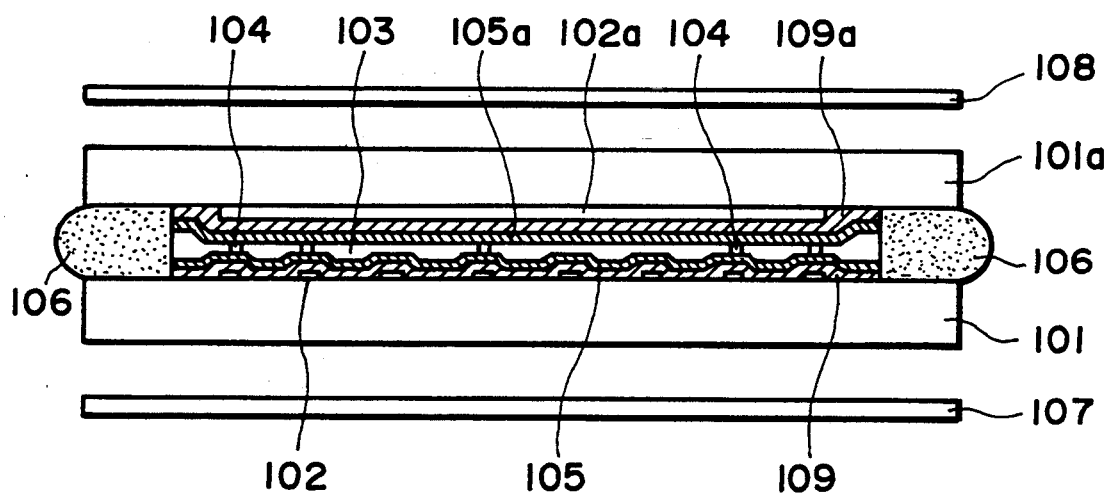
FIG. 1 is a sectional view of a ferroelectric liquid crystal device to be formed by using a pair of substrates obtained by rubbing treatment according to the invention.

Substrates (electrode plates) each having a structure as explained with reference to FIG. 1 were prepared. First of all, a 1.1 mm-thick glass plate was provided, and ITO (indium tin oxide) stripe electrodes were formed thereon, covered with a 600 Å-thick $SiO_2$ film as an insulating film for short circuit prevention and then coated with a polyamic acid for providing a polyimide (of a molecular weight of about $10^4$–$10^6$) having a recurring unit represented by the following formula:

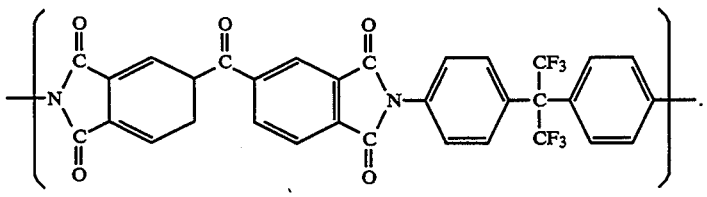

The coating was then baked for about one hour under heating at 300° C. to form a 200 Å-thick polyimide alignment control film.

In the above-described manner, 100 sheets of substrates (electrode plates) were prepared. Rubbing clothes having nylon pile yarn planted thereon were wound about a pair of rollers of a rubbing apparatus as described with reference to FIG. 2, so that the standing directions of the pile yarn thereof about the rollers were reverse to each other as shown in FIG. 3. Then, referring to FIG. 2, the 100 sheets of substrates were successively rubbed by the rubbing rollers so that odd-numbered substrates 101 were rubbed by the rubbing rollers rotating in the direction A while being horizontally moved in the direction C, and even-numbered substrates 101 were rubbed by the rubbing rollers rotating in the direction B while being moved in the direction D. As a result, referring to FIG. 3, the odd-numbered substrates were rubbed by sides F and H of the pile yarn while the even-numbered substrates were rubbed by the opposite sides E and G of the pile yarn.

Then, 5 cells (panels) were prepared by applying the first and second substrates, the 9th and 10th substrates, the 29th and 30th substrates, the 59th and 60th substrates, and the 99th and 100th substrates, respectively with 1.5 μm-dia. silica beads disposed therebetween, so that the uniaxial alignment axes given by the rubbing to the respective pairs of substrates were substantially parallel to each other. Then, the respective cells were filled with a phenylpyrimidine-based mixture liquid crystal ("CS-1014", mfd. by Chisso K. K.) showing the following phase transition series to evaluate the bistability of the cells:

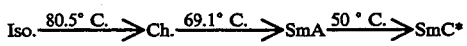

Iso.: isotropic phase

-continued

Ch.: cholesteric phase
SmA: smectic A phase
SmC*: chiral smectic C phase

The bistability of each cell was evaluated by applying rectangular voltage pulses of 20 volts of one polarity to the cell sandwiched between a pair of cross nicol polarizers while changing the pulse widths of the voltage pulses to measure a threshold value (pulse width) for switching from white (W) to black (B), and then applying rectangular voltage pulses of the opposite polarity (i.e., −20 volts) to the cell while changing the pulse widths of the voltage pulses to measure a threshold value (pulse width) for switching from black (B) to white (W). A smaller difference between the two threshold values represents a better bistability. The measured threshold values of the five cell are summarized in the following Table 1.

TABLE 1

| | Example | | | | |
|---|---|---|---|---|---|
| | 1 | 2 | 3 | 4 | 5 |
| | | | Substrates | | |
| | 1st & 2nd | 9th & 10th | 29th & 30th | 59th & 60th | 99th & 100th |
| Threshold (pulse width) | | | | | |
| W→B (μs) | 27.0 | 26.4 | 26.1 | 25.1 | 24.0 |
| B→W (μs) | 26.8 | 26.6 | 25.9 | 25.5 | 23.6 |

Comparative Examples 1-5

Figure 4:
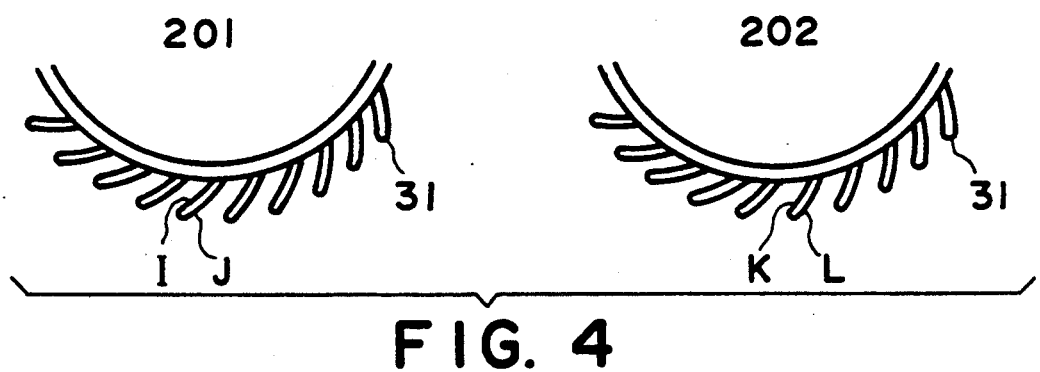
FIG. 4 is a partial side view of a pair of rubbing rollers showing the inclination of pile yarn in a comparative example.
Figure 5:
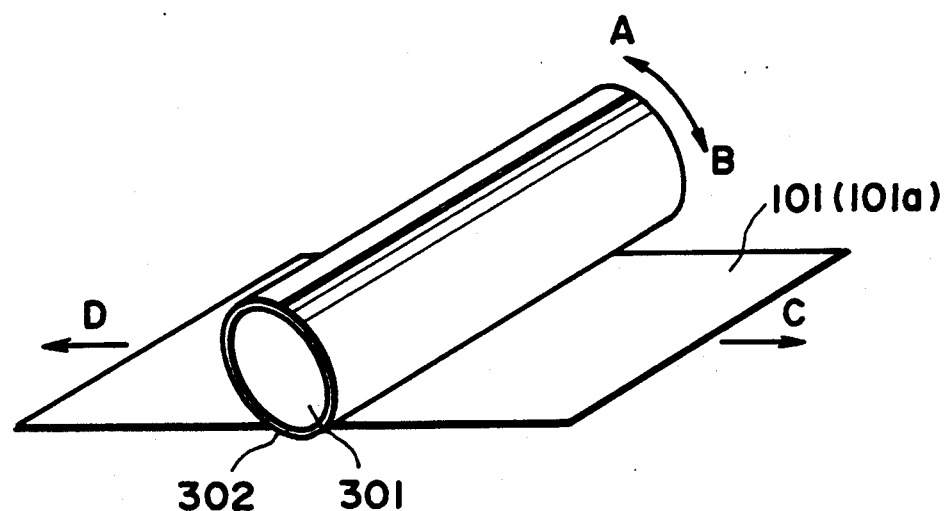
FIG. 5 is a schematic perspective view for illustrating a conventional rubbing method.

In the same manner as in the above Examples, 100 sheets of substrates (electrode plates) were prepared. Then, the 100 sheets of substrates were successively subjected to rubbing treatment in the same manner as in the above Examples except that the rubbing rollers were prepared by winding rubbing clothes having nylon pile yarn planted thereon identical to those used in the Example about the pair of rollers, so that the standing directions of the pile yarn thereof about the rollers were identical to each other as shown in FIG. 4. The rotation directions of the two rollers and the directions of the substrate movement were the same as in the above Examples. That is, referring to FIG. 2, the 100 sheets of substrates were successively rubbed by the rubbing rollers so that odd-numbered substrates 101 were rubbed by the rubbing rollers rotating in the direction A while being horizontally moved in the direction C, and even-numbered substrates 101 were rubbed by the rubbing rollers rotating in the direction B while being moved in the direction D. As a result, referring to FIG. 4, the odd-numbered substrates were rubbed by sides J and L of the pile yarn while the even-numbered substrates were rubbed by the opposite sides I and K of the pile yarn.

Then, 5 cells (panels) were prepared by applying the first and second substrates, the 9th and 10th substrates, the 29th and 30th substrates, the 59th and 60th substrates, and the 99th and 100th substrates, respectively with 1.5 μm-dia. silica beads disposed therebetween, so that the uniaxial alignment axes given by the rubbing to the respective pairs of substrates were substantially parallel to each other. Then, the respective cells were filled with the same mixture liquid crystal as used in the Examples to evaluate the bistability of the cells. The measured threshold values of the five cell are summarized in the following Table 2.

TABLE 2

| | Comparative Example | | | | |
|---|---|---|---|---|---|
| | 1 | 2 | 3 | 4 | 5 |
| | | | Substrates | | |
| | 1st & 2nd | 9th & 10th | 29th & 30th | 59th & 60th | 99th & 100th |
| Threshold (pulse width) | | | | | |
| W→B (μs) | 35.4 | 34.9 | 34.2 | 33.9 | 33.1 |
| B→W (μs) | 24.1 | 23.4 | 23.2 | 22.7 | 21.8 |

As is understood from the results shown in Tables 1 and 2 in comparison, the cells of Comparative Examples showed substantial differences in threshold values between the switching from white→black and the switching from black→white, whereas the cells of Examples showed almost no differences in such threshold values. This means that the cells of Examples had good bistability.

As described above, according to the rubbing apparatus and rubbing method of the present invention, a number of substrates are rubbing-treated by a plurality of rubbing rollers having different standing directions of pile yarn, so that it is possible to provide ferroelectric liquid crystal devices having a sufficient alignment control power and showing good bistability. Further, as the rotation direction of the rubbing rollers is changed for every prescribed number of substrates, preferably for each substrate, the inclination of the pile yarn during the rubbing treatment is prevented and the rubbing rollers can be in service for an extended period. As a result, according to the, present invention, it is possible to uniformly produce ferroelectric liquid crystal devices with excellent performances.

What is claimed is:

1. A method of producing a liquid crystal cell comprising the steps of:
   providing a plurality of substrates, each having thereon an alignment control film for aligning a liquid crystal;
   providing an even number of at least two cylindrical rubbing rollers all rotating in a single prescribed direction wherein a rubbing cloth is wound about each rubbing roller, and the cloth is planted with pile yarn rising above the cloth at an inclined angle;
   positioning the rubbing rollers so that, on half of the rollers, the pile yarn is inclined in a direction following the prescribed rotating direction of the rollers and, on the remaining half of the rubbing rollers, the pile yarn is inclined in a direction opposite to the prescribed rotating direction;
   rotating the rubbing rollers in the prescribed direction; and
   moving said substrates in contact with and relative to the rubbing rollers rotating in the prescribed rotating direction.

2. A method according to claim 1, wherein the prescribed rubbing direction of the rubbing rollers is changed for each substrate.

3. A method according to claim 1, wherein each substrate is rubbed while being moved in a direction identical to a circumferential moving direction of the rotating rubbing rollers rubbing the substrate.

4. A method according to claim 1, wherein said alignment control film comprises a polyimide film.

5. A method according to claim 1, wherein said pile yarn comprises nylon.

6. A method according to claim 1, wherein said liquid crystal is a liquid crystal composition containing a mesomorphic compound having a phenylpyrimidine skeleton.

7. A method according to claim 1, wherein said liquid crystal has a ferroelectric phase.

8. A method according to claim 7, wherein said liquid crystal is bistable.

* * * * *